J. L. JOHNSON.
Hand-Truck Attachment.
No. 219,402. Patented Sept. 9, 1879.
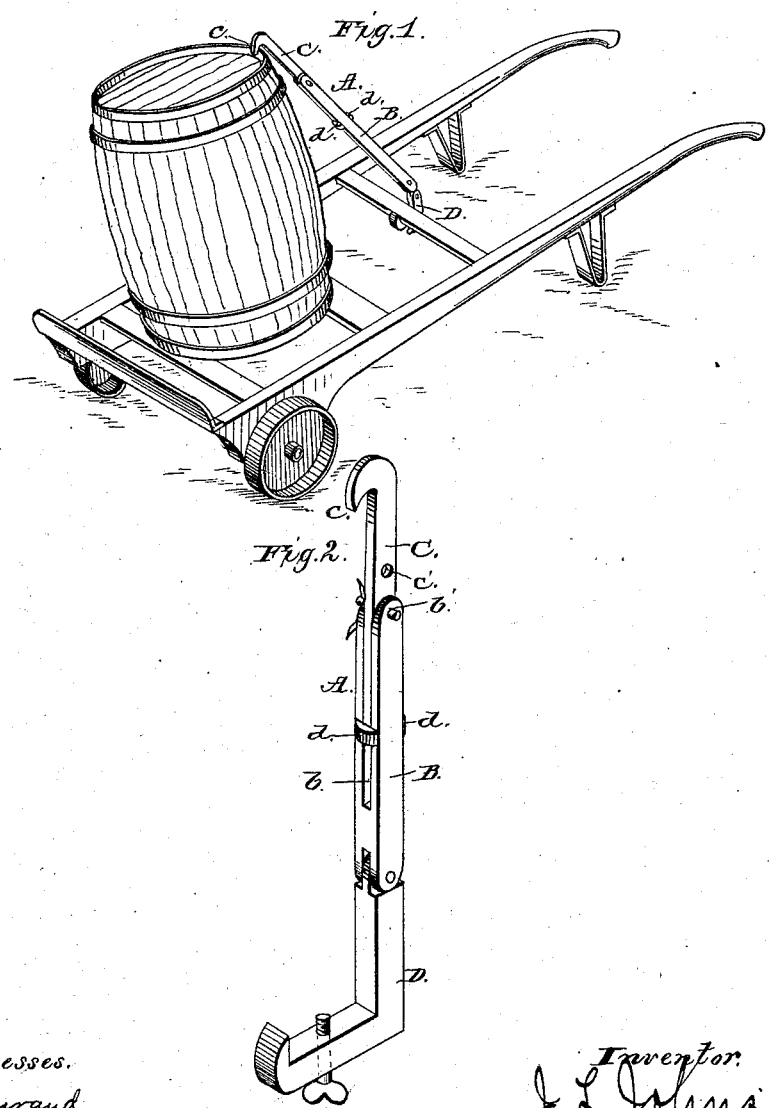

UNITED STATES PATENT OFFICE.

JOSEPH L. JOHNSON, OF CLAYTON, NORTH CAROLINA.

IMPROVEMENT IN HAND-TRUCK ATTACHMENTS.

Specification forming part of Letters Patent No. 219,402, dated September 9, 1879; application filed July 26, 1879.

*To all whom it may concern:*

Be it known that I, JOSEPH L. JOHNSON, of Clayton, in the county of Johnston and State of North Carolina, have invented certain new and useful Improvements in Attachments for Hand-Trucks; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1 represents a perspective view of a truck, showing my improved attachment as applied thereto for securing a cask or barrel in an upright position. Fig. 2 is a perspective view of the attachment.

This invention relates to certain new and useful improvements in the class of attachments especially designed for securing casks, barrels, &c., in an upright position on trucks; and the invention consists in a novel construction of attachment, all as will be hereinafter fully described, and specifically set forth in the claim.

In the drawings, A represents my improved attachment, composed of the sectional hooked bar B C and the right-angled hooked bar D, pivoted in the lower end of the bar B. The bar B is provided with a central opening, $b$, transversely through the same, and extending about two-thirds of its length. This opening is for the reception of the bar C, which is provided or formed with a hook, $c$, at its outer end.

The bar C is provided with a series of holes, $c'$, through which and a hole, $b'$, through the bar B a bolt or pin is passed for securing the bar C in position. By means of the holes in the bar C it can be adjusted in the bar B, for the purpose of lengthening or shortening the attachment, so as to be applied to barrels or casks of different height. The bar C is also provided with cleats $d\ d$ upon opposite sides of the bar B, which secures the bar C from any movement in the bar B except a longitudinal movement in lengthening or shortening the attachment.

To apply my attachment, a cask or barrel is placed on the truck in an upright position. The right-angled bar D is then hooked under one of the cross-bars of the truck. The bar C is then adjusted in the bar B to correspond with the height of the cask or barrel, and is then hooked over the chine of the cask or barrel, all as clearly represented in Fig. 1, thus securing the cask or barrel firmly in position upon the truck.

I am aware that adjustable attachments for securing casks or barrels upon trucks are old, and such I do not desire to claim, broadly, as my invention; but,

Having thus fully described my invention, what I claim as new, and desire to secure by Letters Patent, is—

The herein-described truck attachment, consisting of the slotted and perforated bar B $b\ b'$, the right-angled hooked bar D, pivoted to the lower end of the bar B, and the hooked bar C $c$, provided with a series of holes, $c'$, and the cleats $d\ d$, adjustably secured in the slotted bar B, substantially as and for the purpose specified.

In testimony that I claim the foregoing as my my own I hereunto affix my signature in presence of two witnesses.

JOSEPH L. JOHNSON.

Witnesses:
W. R. CURRALL,
JAS. T. POOL.